(12) United States Patent
Kovtun et al.

(10) Patent No.: US 8,150,169 B2
(45) Date of Patent: Apr. 3, 2012

(54) SYSTEM AND METHOD FOR OBJECT CLUSTERING AND IDENTIFICATION IN VIDEO

(75) Inventors: Ivan Kovtun, Kyiv (UA); Yuriy Musatenko, Kyiv (UA); Mykhailo Schlesinger, Kiev (UA)

(73) Assignee: Viewdle Inc., Palo Alto, CA (US)

( * ) Notice: Subject to any disclaimer, the term of this patent is extended or adjusted under 35 U.S.C. 154(b) by 699 days.

(21) Appl. No.: 12/211,493

(22) Filed: Sep. 16, 2008

(65) Prior Publication Data

US 2010/0067745 A1 Mar. 18, 2010

(51) Int. Cl.
*G06K 9/62* (2006.01)
*G06K 9/34* (2006.01)

(52) U.S. Cl. ..................... 382/225; 382/173

(58) Field of Classification Search .......... 382/162–181, 382/224–228
See application file for complete search history.

(56) References Cited

U.S. PATENT DOCUMENTS

| | | | | |
|---|---|---|---|---|
| 5,519,789 A * | 5/1996 | Etoh | | 382/225 |
| 5,857,030 A * | 1/1999 | Gaborski et al. | | 382/132 |
| 5,917,936 A * | 6/1999 | Katto | | 382/154 |
| 6,263,088 B1 * | 7/2001 | Crabtree et al. | | 382/103 |
| 6,404,925 B1 * | 6/2002 | Foote et al. | | 382/224 |
| 6,535,639 B1 * | 3/2003 | Uchihachi et al. | | 382/225 |
| 6,591,007 B1 * | 7/2003 | Petkovic et al. | | 382/162 |
| 6,594,751 B1 | 7/2003 | Leivent | | |
| 6,711,287 B1 * | 3/2004 | Iwasaki | | 382/165 |
| 6,744,922 B1 * | 6/2004 | Walker | | 382/190 |
| 6,751,354 B2 * | 6/2004 | Foote et al. | | 382/224 |
| 6,754,389 B1 | 6/2004 | Dimitrova et al. | | |
| 6,778,705 B2 * | 8/2004 | Gutta et al. | | 382/224 |
| 6,807,306 B1 * | 10/2004 | Girgensohn et al. | | 382/225 |
| 6,810,144 B2 * | 10/2004 | McGee et al. | | 382/166 |
| 6,847,733 B2 * | 1/2005 | Savakis et al. | | 382/225 |
| 7,133,571 B2 * | 11/2006 | Cheatle | | 382/282 |
| 7,433,497 B2 * | 10/2008 | Chen | | 382/107 |
| 2001/0035907 A1 | 11/2001 | Broemmelsiek | | |
| 2003/0161500 A1 | 8/2003 | Blake et al. | | |
| 2003/0197779 A1 | 10/2003 | Zhang et al. | | |
| 2003/0218672 A1 | 11/2003 | Zhang et al. | | |

(Continued)

FOREIGN PATENT DOCUMENTS

EP 0625764 A2 11/1994

OTHER PUBLICATIONS

Ian Davidson and Sugato Basu: "A Survey of Clustering Instance Level". ACM Transactions on Knowledge Discovery from Data. vol. w, No. x.x. (Oct. 12, 2007). pp. 1-41.

(Continued)

*Primary Examiner* — Manav Seth
(74) *Attorney, Agent, or Firm* — Fenwick & West LLP

(57) ABSTRACT

Embodiments of computer implemented methods and systems for object clustering and identification are described. One example embodiment includes receiving an unclustered video object, determining a first distance between the unclustered video object and an arbitrary representative video object, the arbitrary representative video object being selected from representative video objects, estimating distances between the unclustered video object and the representative video objects based on the first distance and precalculated distances between the arbitrary representative video object and the representative video objects, and, based on the estimated distances, selectively associating the unclustered video object with a video cluster, thereby producing a clustered video object.

23 Claims, 10 Drawing Sheets

U.S. PATENT DOCUMENTS

| | | |
|---|---|---|
| 2004/0017933 A1 | 1/2004 | Lestideau |
| 2004/0223631 A1 | 11/2004 | Waupotitsch et al. |
| 2006/0155398 A1 | 7/2006 | Hoffberg et al. |
| 2006/0165258 A1 | 7/2006 | Avidan |
| 2006/0200260 A1 | 9/2006 | Hoffberg et al. |

OTHER PUBLICATIONS

Charles Elkan: "Using the Triangle Inequality to Accelerate κ-Means". Proceedings of the Twentieth International Conference on Machine Learning (ICML—Aug. 21, 2003), Washington DC. pp. 147-153.

Bastian Leibe, Krystian Mikolajczk and Bernt Schiele: "Efficient Clustering and Matching for Object Class Recognition". Proceedings on the 17th British Machine Vision Conference. Leeds, UK. (Sep. 4, 2006), pp. 1-10.

Brendan J. Frey and Delbert Dueck: "Clustering by Passing Messages Between Data Points" Science, vol. 315. (Feb. 16, 2007). pp. 972-976.

Ian Davidson: "A Survey of Clustering with Instance Level Constraints". Google Search: http://www.google.com/search?hl=en&q=%22A+Survey+of+Clustering+with+Instance+Level+Constrants%22&tbs=cdr%3A1%Ccd_... (Retrieved Jan. 25, 2010).

Ian Davidson: "A Survey of Clustering with Instance Level Constraints". Screenshot from www.cs.ucdavs.edu/{davidson/constrained-clustering/CAREER/Survey.pdf> (Retrieved Jan. 27, 2010).

Daoquiang Zhang, Songcan Chen, Zhi-Hua Zhou and Qiang Yang: "Constraint Projections for Ensemble Learning". Proceedings of the 23rd National Conference on Artificial Intelligence—vol. 2. Chicago, Illinois (2008). pp. 758-763. Retrieved from the Internet: http://portal.acm.org/citation.cfm?1d=1620190> (Retrieved Jan. 27, 2010).

"AAAI 2008" Twenty-Third Conference on Artificial Intelligence. Retrieved from the Internet: http//www.aaai.org/Conferences/AAAI/aaai08.php>. (Retreived Jan. 27, 2010).

"Cached version of "A Survey of Clustering with Instance Level Constraints," Dated Oct. 12, 2007," Google cache, [Online] [Retrieved on Jan. 25, 2010] Retrieved from the Internet<URL:http://74.125.77.132/search?q=cache:fNtICKwmU94J:www.cs.ucdavis.edu/{davidson/constrained-clustering/CAREER/Survey.pdf+%22A+Survey+of+Clustering+with+Instance+Level+Constraints%22&cd=1&hl=en&ct=clnk>.

PCT International Search Report and Written Opinion, PCT Application No. PCT/US2009/056828, Feb. 19, 2010, 16 pages.

PCT International Preliminary Report on Patentability, PCT Application No. PCT/US2009/056828, Mar. 31, 2011, 11 pages.

European Examination Report, European Application No. 09792510.1, Nov. 4, 2011, 8 pages.

* cited by examiner

SYSTEM AND METHOD FOR OBJECT CLUSTERING AND IDENTIFICATION IN VIDEO

FIELD

This application relates generally to data processing, and more specifically to system and method for object clustering and identification in video.

BRIEF DESCRIPTION OF DRAWINGS

Embodiments are illustrated by way of example and not limitation in the figures of the accompanying drawings, in which like references indicate similar elements and in which.

DETAILED DESCRIPTION

Figure 1:
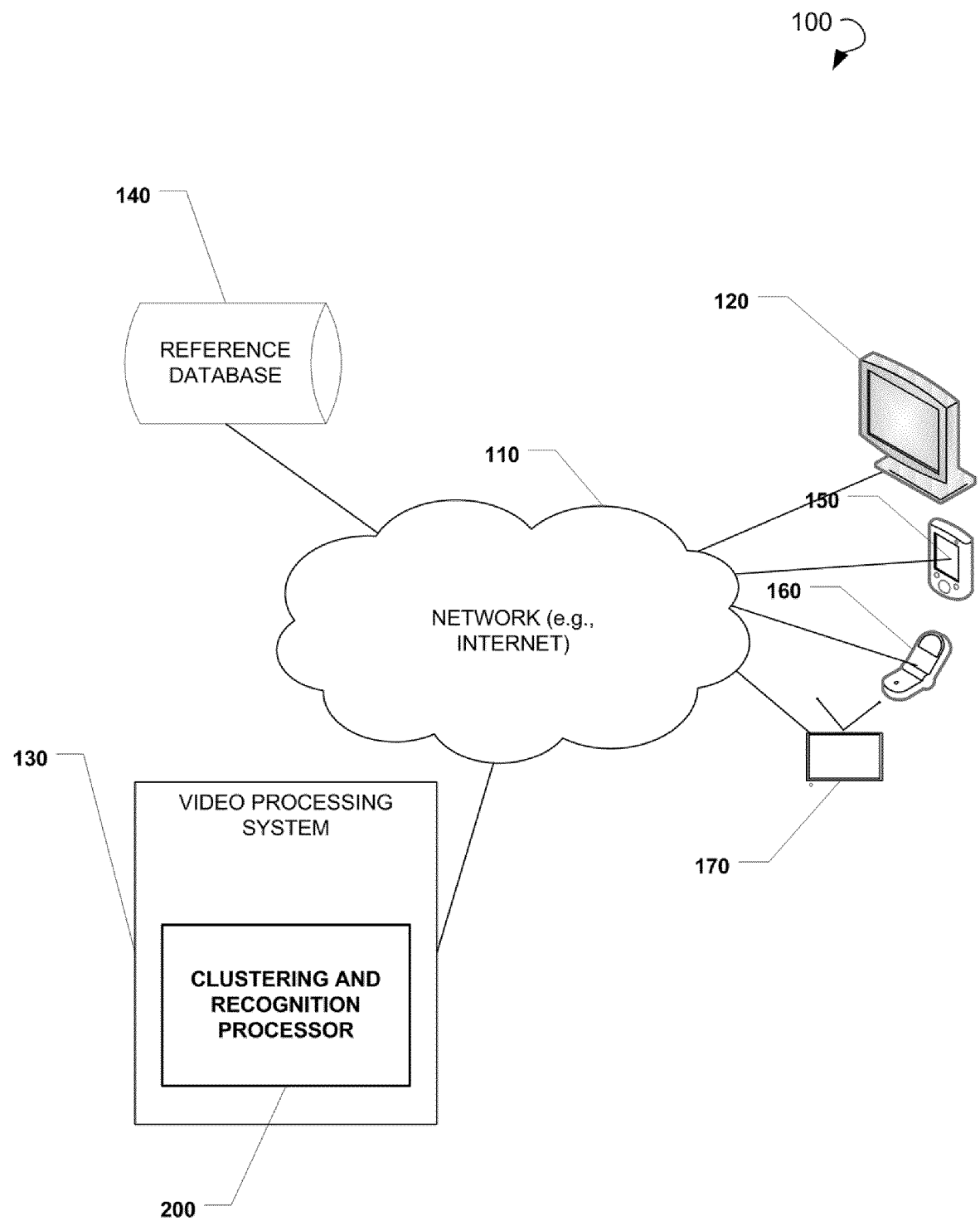
FIG. 1 is a diagrammatic representation of a network environment within which a system and method of the present application are implemented, in accordance with an example embodiment.

Object clustering and identification in video have proven to be difficult tasks. Some of the difficulties relate to the computational complexity of measuring the differences between the video objects.

The method for object clustering and identification may commence with receiving an unknown video object to be "recognized". The unknown video object may be clustered with similar video objects. The clustering may commence with determining a distance between the unknown video object and an arbitrary representative video object. The arbitrary representative object may be selected from a group of representative video objects. Each representative object in the group may represent a cluster of video objects with identifiable similarities. The arbitrary representative object may be selected arbitrarily or based on defined criteria. The arbitrary representative object may be utilized to estimate, based on a triangle inequality, distances between the unknown video object and the representative video objects.

Because the distances between the representative objects and the arbitrary representative object may be pre-calculated, the only complex real-time calculation involved may involve obtaining the estimates of the distances between the unknown video object and the representative video objects, is the distance between the unknown video object and the arbitrary representative video object. Based on the estimated distances, the unknown video object may be associated with an appropriate video cluster. Once clusters are formed, each cluster's representative video object may be compared to known reference video objects in order to "recognize" the video objects in the clusters.

In some example embodiments, a video object is a normalized facial image obtained from a still video image. The normalization process is described in more detail below. Video objects may be represented as points in a multidimensional vector space. The multidimensional vector space may be Euclidian or non-Euclidian. In this vector space, the difference between two video objects may be expressed as a metric or other distance between two points. Thus, comparing two video objects may involve determining the distance between the two points in the multidimensional vector space.

Determination of distances between points representing video objects in a multidimensional vector space may be of high computational complexity. The system and method for object clustering and identification, described here, utilizes a fast nearest point search algorithm to advantageously estimate the distances. The fast nearest point search algorithm is an optimization algorithm for finding closest points in metric spaces. Furthermore, the fast nearest point search algorithm may be utilized in cases of space metric properties defined with a certain degree of error. The fast nearest point search algorithm is described in more detail below.

Clustering of video objects, as used within the context of this disclosure, is a classification of video objects into different groups called clusters so that all video objects in the same group are likely to be associated with the same person even though the person may be unknown at the time of the association. The video objects that are stored in clusters are called cluster representatives because they are deemed to be representative of the person associated with the cluster and yet sufficiently distinct from other representative video objects in the cluster to be a representative object of its own. Selection of a representative cluster may include the following.

A new video object is compared to the existing cluster representatives when there are any existing clusters. The comparison may be made by determining a distance between points in the vector space that correspond to the video objects being compared. Upon the comparison, it may be determined that the new video image belongs to an existing cluster or clusters because the distances between the new video image and the respective representative video objects are smaller than a first predetermined threshold distance.

If there exists one or more representative object so that the distance between the new object and that representative object is smaller than a second predetermined threshold distance (the second threshold distance being smaller than the first predetermined threshold distance), the new video object does not becomes a representative object. This is done to reduce number of the representative video objects, which are substantially similar to each other. For the closest representative object within the second threshold distance to the new video object, a respective presence rate is increased. The presence rate is a counter associated with each representative object that counts the number of video objects substantially similar to the representative object found in video stream.

If, for any representative object in the cluster, the distance between the new video object and the existing cluster representative is between the first and the second threshold distances, the new video object is selected as a new representative object of the cluster with a presence rate equal to one while the presence rates of the other representative video objects remain the same. When the difference between the new video object and each representative object is greater than the first predetermined threshold, or there are no existing clusters, a new cluster is created and the new video object becomes the new cluster's first representative object. The clustering method is described in more detail below.

In another aspect of the present disclosure, identification of the clustered but unidentified video objects may be performed by comparing unidentified cluster representatives to the reference video objects from a reference database. The comparison may involve determining distances between the points in a vector space associated with the video objects being compared. Once an unidentified representative video object is identified as the same object as a reference video object, unidentified objects associated with the cluster may also be identified as the reference video object.

It will be become apparent to a person skilled in the art that various strategies may be utilized in making identification decisions when comparing clusters' representative objects to the reference objects. For example, a reference object within a predetermined distance of the maximum number of representative objects of a cluster may be considered to identify all objects in the cluster. Furthermore, when several reference objects are within a predetermined distance of cluster representative objects, additional sources of information may be utilized to resolve the ambiguity. Example information utilized to resolve the ambiguity may include speaker voice recognition, optical character recognition of the text in the video, recognition of names in the transcript of the video stream, subtitles, automatically recognized speech, and other metadata beneficial in improving reliability of the identification decisions.

The fast nearest point search algorithm for finding closest points in metric spaces, described in more detail below, may be utilized to increase the speed of the identification of representative video objects when comparing the representative video objects to the reference video objects. Identification of cluster representative objects may be made based on the decision as to which reference object the objects in a cluster are most similar. The fast nearest point search algorithm mentioned above and described in more detail below permits lowering the number of distance calculations between unclustered video objects and cluster representatives during the clustering process.

The normalization of facial images obtained from still video images to produce visual objects is described herein. Facial images in closely related frames are more likely to be facial images of the same person. This may permit making certain assumptions, thereby decreasing the number of comparisons during the clustering process. Detection of facial images may be performed by an Adaptive Boosting (AdaBoost) method. AdaBoost is a machine learning meta-algorithm that may be used in conjunction with many other learning algorithms to improve their performance. The AdaBoost method permits detecting facial images and salient features of the facial images such as eyes and/or ears. The Wikipedia article describing how the AdaBoost method may work is hereby incorporated by reference http://en.wikipedia.org/wiki/Adaboost.

Once the salient features are detected, the facial image may be aligned. The alignment of the facial images may be performed by scaling, rotating, and shifting the facial image so that the eyes are located at the predetermined coordinates and the facial image fits into a predetermined image size. The method may proceed to normalize the facial image by brightness. Other methods may be used to detect facial images. The system and method for object clustering and identification may be implemented in the context of a network environment. A network environment 100 is illustrated by way of example in FIG. 1.

As shown in FIG. 1, the network environment 100 may include a network 110. The network 110 may be a public network (e.g., the Internet, a wireless network, etc.) or a private network (e.g., Local Area Network (LAN), Wide Area Network (WAN), Intranet, etc.). The network environment 100 may further include user interfaces devices 120 such a personal computer (PC), a Personal Digital Assistant (PDA) 150, a mobile telephone 160, a Television (TV) 170, a video processing system 130, and a reference database 140.

The user interface devices 120, shown in the context of the network environment 100, may be configured to interact with the video processing system 130 via the network 110. The user interface devices 120 may include Graphical User Interfaces (GUIs). The reference database 140, in some example embodiments, may be configured as a structured collection of records or data that are stored in a computer system so that a computer program or person using a query language may consult it to answer queries. The records retrieved in answer to queries are information that can be used to make logical decisions.

The video processing system 130 may be a general-purpose computer processor or a type of processor designed specifically for receiving, creating, and distributing digital media. The video processing system 130 may include a clustering and recognition processor 200. In some example embodiments, the video processing system 130, or its components and/or the reference database 140, may reside within the user interface devices having sufficient computational capacity to run the video processing system 130 and/or its components. The clustering and identification processor 200 is described by way of example with reference to FIG. 2.

Figure 2:
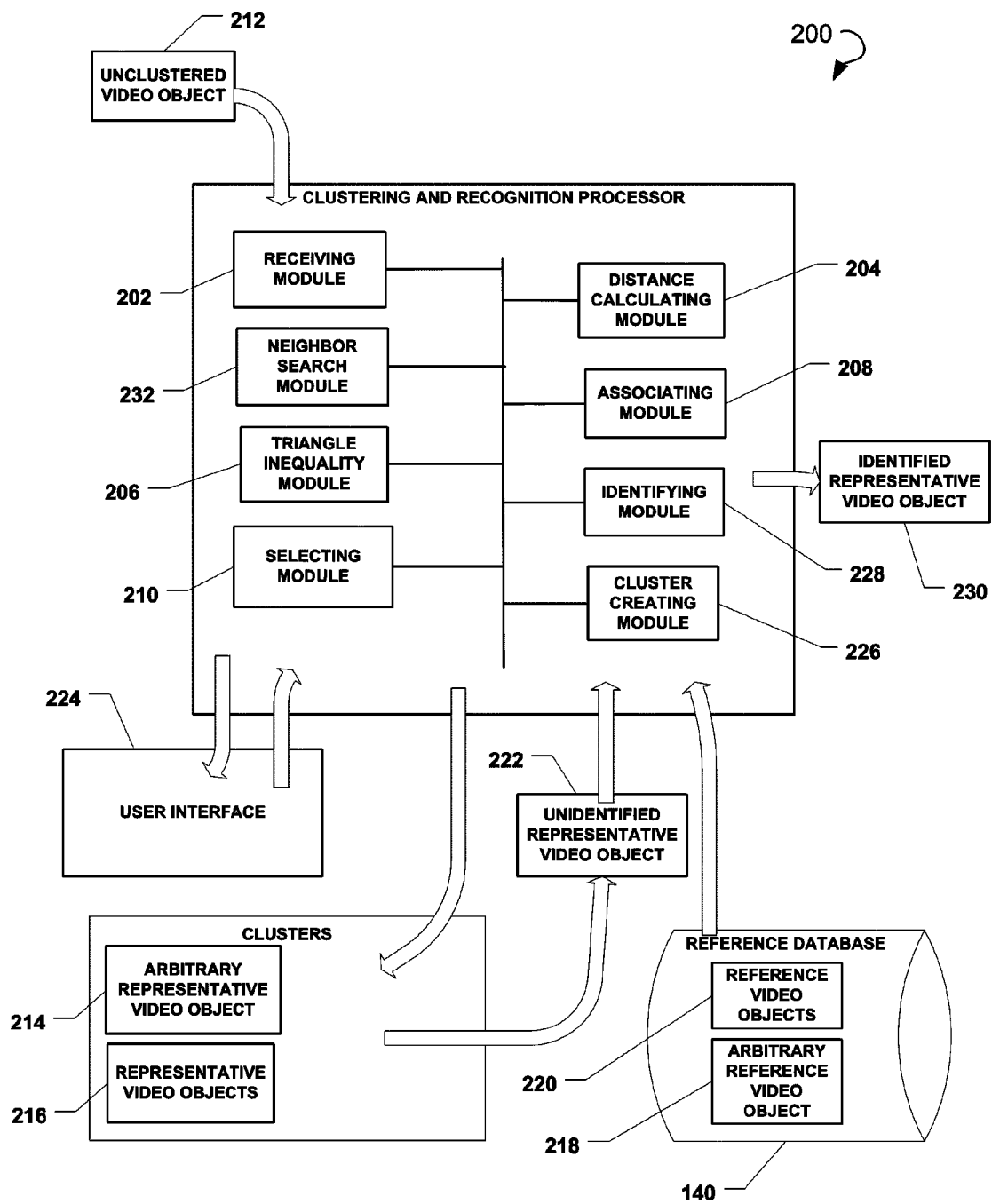
FIG. 2 is a block diagram illustrating clustering and an identification processor, in accordance with an example embodiment.

FIG. 2 is a block diagram illustrating the clustering and recognition processor 200, in accordance with an example embodiment. The example clustering and identification processor 200 may include a receiving module 202, a distance calculating module 204, a triangle inequality module 206, a neighbor search module 232, an associating module 208, a selecting module 210, an unclustered video object 212, an arbitrary representative video object 214, representative video objects 216, an arbitrary reference video object 218, reference video objects 220, an unidentified representative video object 222, a user interface 224, a cluster creating module 226, an identifying module 228, and an identified representative video object 230.

The receiving module 202 may be configured to receive a video object. The video object may be the unclustered video object 212 obtained from a video frame or the unidentified representative video object 222 selected to represent a cluster. The distance calculating module 204 may be configured to calculate distances between objects represented by points in a multidimensional vector space. The neighbor search module 232 may be configured to search a subset of representative video objects 216 located closely to the unclustered video object 212 or any reference video object (or vice versa). During the search, neighbor search module 232 may utilize distance calculating module 204 and triangle inequality module 206.

As used within the context of this disclosure, pre-calculated distances are distances between video objects calculated before either the clustering of an unknown video object or the identification of a cluster representative objects commence. During the clustering process, the set of pre-calculated distances may increase with the addition of new representative objects to the cluster. Representative objects' mutual distances are calculated during the clustering processes. However, for a large number of unknown objects that may never become representative objects, usage of the neighboring search algorithm may permit avoiding slower distance calculations.

The distance calculating module 204 may be utilized to pre-calculate distances between the arbitrary representative video object 214 and the representative video objects 216. The pre-calculated distances may be utilized in estimating distances between the unclustered video object 212 and the representative video objects 216, as well as between the unclustered video object 212 and the arbitrary reference video object 218 and the representative video objects 216. The distance calculating module 204 may also be utilized to pre-calculate distances between the arbitrary reference video object 218 and the reference video objects 220. Furthermore, the pre-calculated distances may be utilized in estimating distances between a currently selected reference object and all representative objects.

The triangle inequality module 206 may be configured to approximate distances between objects based on the distances pre-calculated by the distance calculating module 204. The triangle inequality module 206 may approximate the distances between video objects by implementing the triangle inequality theorem stating that for any triangle, the measure of a given side must be less than or equal to the sum of the other two sides but greater than or equal to the absolute difference between the two sides. The utility of the triangle inequality module 206 in estimating distances between an unclustered video object 212 and the representative video objects 216 (as well as the arbitrary reference object 218 and representative video objects 216 and the reference video objects 220) is performed by the neighbor search module 232 and is described in more detail below.

It will be noted that objects similar to the reference objects may be searched for among the unidentified representative objects (for every reference object the nearest representative may be found) as well as the objects similar to the unidentified representative objects may be searched for among the reference objects. In some example embodiments, searching for reference objects among the unidentified representative objects may be advantageous because the number of the representative objects may be considerably smaller than the number of the reference objects. Accordingly, pre-calculating distances between the representative objects may result in a more efficient search.

The associating module 208 may be configured to associate the unclustered video object 212 with a cluster based on the comparison of the unclustered video object 212 to the representative video objects 216. The distance between the unclustered video object 212 and the representative video objects 216 may need to be within a predetermined threshold for the associating module 208 to make a decision to cluster the unclustered video object 212. The selecting module 210 may be configured to select one of the representative video objects 216 representing the cluster with which the unclustered video object 212 is to be clustered.

The arbitrary representative video object 214, in some example embodiments, is a cluster representative selected randomly or sequentially from cluster representatives in order to be iterated over representative objects or to pre-calculate distances utilized by the triangle inequality module 206 in estimating distances between objects while clustering the unclustered video object 212 using neighbor search module 232. The representative video objects 216, in some example embodiments, are objects, which were selected by the selecting module 210 as representative video objects of their respective clusters as described above.

The representative video objects may be assigned a presence rate as described above, which is a counter being incremented when the unclustered video object 212 is closer to the cluster representative object than the second threshold. In some example embodiments, the representative video objects 216 may be filtered after the clustering completes, so that only the objects with the highest presence rate are preserved within their respective clusters. Thus, only filtered out clusters may be recognized during the identification stage.

The arbitrary reference video object 218, in some example embodiments, is a reference video object selected randomly or sequentially from the reference video objects so that the neighbor search module 232 may find its neighboring objects among representative objects. The reference video objects 220, in some example embodiments, are identified objects. The reference video objects 220 may be high definition visual images. In order to be identified, the unidentified representative video object 222 may be compared to the reference video objects 220.

A single identified video object may be represented by many corresponding reference images showing different views of the object. Once the unidentified representative video objects are identified, the objects in the cluster represented by the unidentified representative video objects may become identified using various identification decision rules. Possible identification decisions may be based on a) the representative object being within the smallest distance of some reference object making the decision for all the other cluster representatives, b) the reference object which identifies the most representative objects of the cluster may be chosen to identify all the representative objects of the cluster, and c) rules taking into account other information about the video stream (as described above).

The user interface 224 may be configured to permit manual identification of the unidentified representative video object when no reference video object is found within the predetermined distance. The reasons behind a failure to associate the unidentified representative video object with a reference video object may include the fact that the proper reference video object does not exist in the reference database 140. An operator may then use the user interface 224 to observe the object and determine whom the object resembles. Once the manual identification is conducted, the reference database 140 may be updated to include the proper reference video object.

The cluster creating module 226 may be configured to create a new cluster when no cluster is determined to be within the threshold distance of the unclustered video object 212. The reasons for failure to find a cluster for the unclustered video object may include the fact that the unclustered video object represents a facial image appearing in the video for the first time. The identifying module 228 may be configured to identify an unidentified representative video object 222 and to associate the metadata of the reference video object used for the identification purposes with the objects of the cluster represented by the unidentified representative video object. This approach permits identifying the objects in clusters (both representative and only counted in the presence rate) by identifying their representative video objects.

Figure 3:
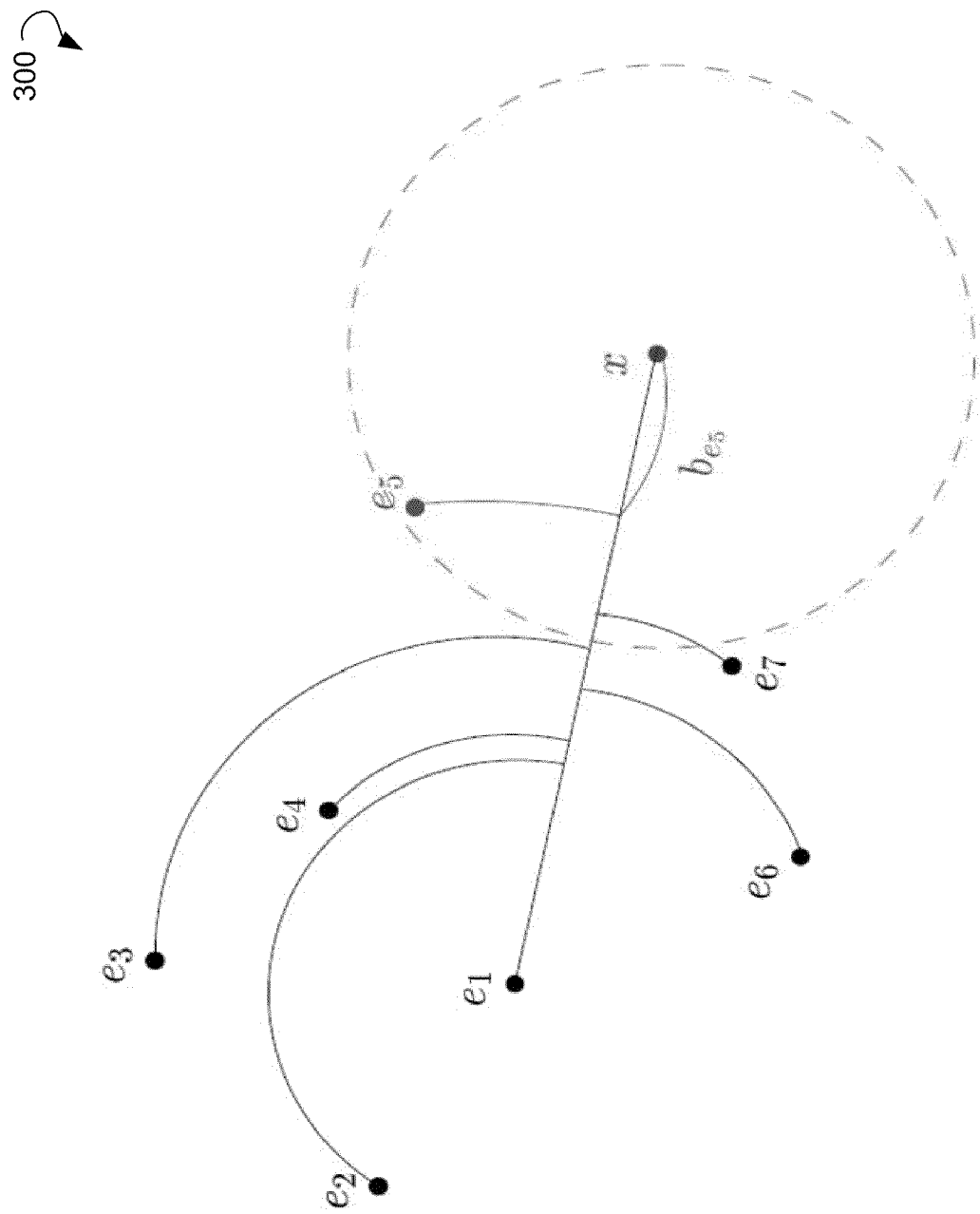
FIG. 3 is a diagram showing points representing video objects in a vector space for illustrating a fast neighboring points search method, in accordance with an example embodiment.

FIG. 3 is a diagram illustrating points representing video objects in a vector space, in accordance with an example embodiment. FIG. 3 shows how a neighboring points search algorithm may be utilized to estimate the distances between video objects represented by points in a vector space. Thus, considering FIG. 3 within the context of object clustering, the distance between the unclustered video object 212 (x in the diagram 300) and a cluster representative (any other point in the diagram 300) may be determined using a distance function d(x, e). Similarly, considering FIG. 3 within the context of object identification, the distance between the unidentified representative video object and the reference video objects 220 may be determined using a distance function.

For example, point x may represent an object in the vector space that needs to be identified or clustered by comparing the object to reference objects or cluster representatives represented by points $e_1 \ldots e_7$ in FIG. 3 The distance between point x and point $e_1$ may be expressed as $d(B(A(x)), N(B(A(e_1))))$, where A(.) is an alignment function that moves eyes to the proper aligned position, B(.) is a brightness normalization function, and N(.) is a subset of either reference objects or cluster representative objects.

To find an object closest to x (where x may represent an unclustered video object or current reference video object), the distance function shown above may be utilized to calculate distance between x and nearest representative $$e_n = \underset{\{e \in E\}}{\operatorname{argmin}} d(x, e).$$

The distance function $d(B(A(x)), N(B(A(e))))$ may be a Euclidian distance function or a specific and complex similarity measure utilized to compare two facial images. Calculations of distances using such distance functions may involve considerable computational capacities. The fast neighboring points search algorithm utilized by the present application permits decreasing the number of distance calculations.

In some example embodiments it may be assumed that when two points representing objects are close enough, they represent the same object (e.g., a facial image of the same person). A set C(x) of points near point x may be found, such that the distances between the points in C(x) and x are within some fixed threshold value $\epsilon$. $C(x) := \{e \in E: d(x, e) \leq \epsilon\}$, where E is a set of reference video objects, d(.,.) is a distance function that satisfies triangle inequality (d(a, b)<d(b, c)+d(c, a)), and $\epsilon$ is the predetermined threshold for two video objects to represent the same facial image.

The diagram 300 exemplifies this approach. As shown in the diagram 300, a set of points $e_1, \ldots, e_7$ is given. First, the distance between x and $e_1$ may be calculated. The distance between x and $e_1$ may permit other distances to be estimated, using the triangle inequality theorem, from the pre-calculated distances between $e_1$ and $e_2, \ldots, e_7$. It may be seen from the diagram 300, that $b_{ei} := d(x, e_1) - d(e_1, e_i)$ is the lower bound estimate of a true $d(x, e_i)$ distance. It follows that the true distance is not less than $b_{ei}$. The distances $d(e_1, e_i)$ are pre-calculated either in advance or in the process by the distance calculating module 204 and therefore values $b_{ei}$ are calculated without distance calculations just by subtracting one known value from another known value.

From the values of $b_{ei}$, it may be concluded that the reference points $e_1$, $e_2$, $e_3$, $e_4$ and $e_6$ are farther from x than the predetermined threshold distance and, therefore, there is no need to calculate distances between x and $e_2$, $e_3$, $e_4$ and $e_6$ when the low bound estimate of the distances is larger than predetermined threshold. In other words, if the low bound distance estimate is larger then the predetermined threshold then these points are not be within the threshold distance of point x and they may be excluded from further consideration without additional distance calculations. Such an approach may permit finding all points that are within the $\epsilon$ vicinity of x with fewer distance function d(x,e) calculations than would be needed in the case of calculating all distances from x to all $e_i$ points. Because the distance between x and $e_5$ is estimated to be the smallest, the distance $d(x, e_5)$ may be calculated after it is determined that $d(x, e_5) < \epsilon$, $e_5$ is included in the set of points within the threshold distance. Calculating the distance to the remaining reference point $e_7$ may show that the distance between $e_7$ and x is above the predetermined threshold. Thus, only two complex distance calculations are performed instead of the seven that would be performed otherwise.

As already mentioned above, the method for object clustering and identification utilizes the fast neighboring points search algorithm. In the context of the object clustering method, two thresholds may be utilized. The first threshold may be utilized to determine whether the unclustered video object 212 belongs to an existing cluster. The second threshold may be utilized to count the presence rate of objects in the cluster. Thus, when the unclustered video object 212 is obtained, it may be compared to a representative object selected from the representative video objects 216. If the distance between the representative object of an existing cluster and the unclustered video object is below the first threshold (and above the second threshold), the unclustered video object is placed in the cluster.

If the distance between the unclustered video object and its nearest neighbor object from a video stream is below the second threshold, the presence rate for the representative object is increased. If, on the other hand, the distance between the unclustered video object and its nearest object in the video stream is above the second threshold, the unclustered video object may become a representative object of the cluster. This is because the unclustered video object may represent something that is not yet described by the cluster. If the distance between the unclustered cluster and the representative object is greater than the first threshold, a new cluster may be created and the unclustered video object added to this new cluster. An example workflow of a neighboring points search algorithm may be described by way of example with reference to FIG. 4.

Figure 4:
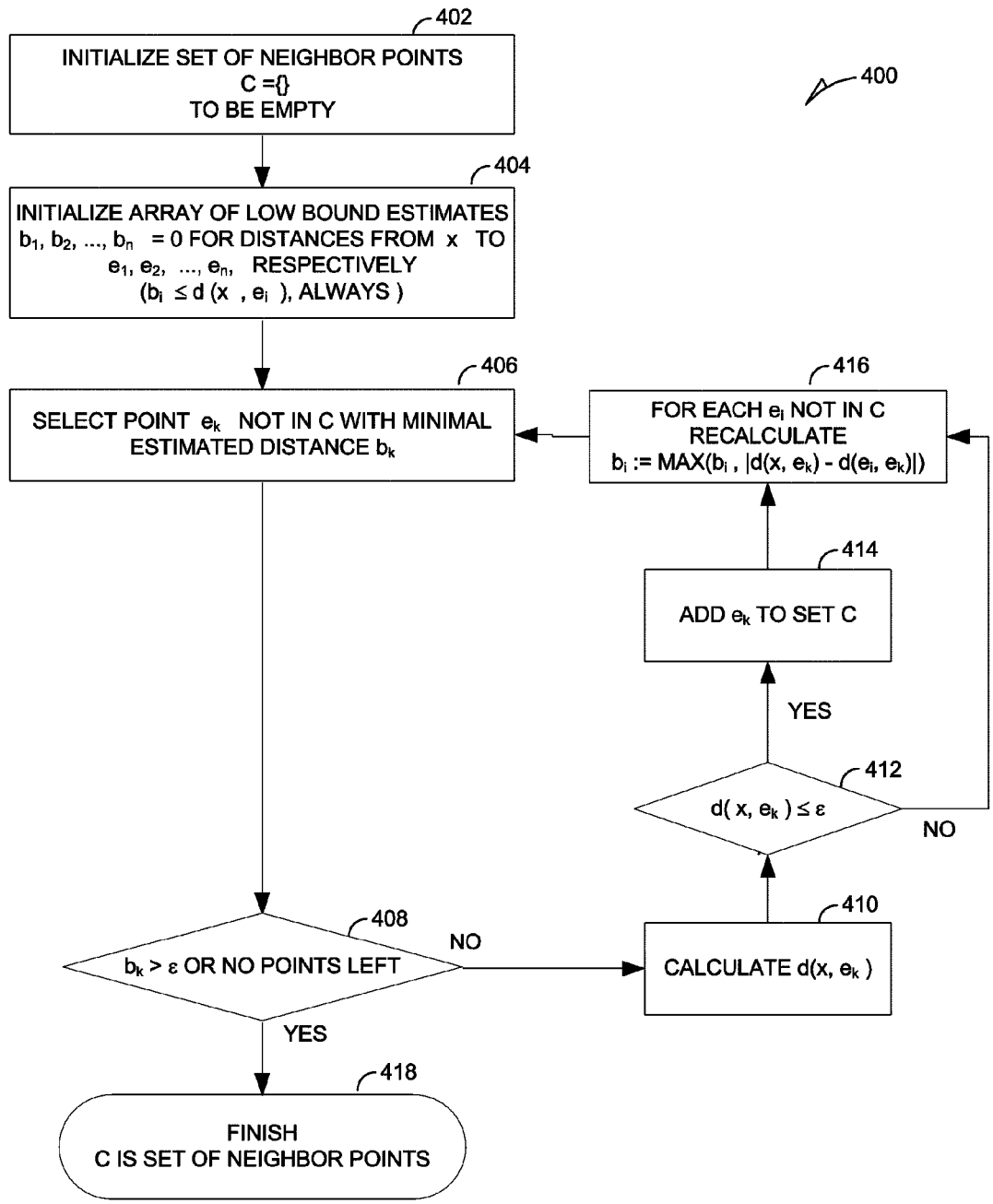
FIG. 4 is a flow chart illustrating a neighboring points search algorithm workflow, in accordance with an example embodiment.

FIG. 4 is a flow chart illustrating a neighboring points search algorithm workflow, in accordance with an example embodiment. As already mentioned above, in order to determine which objects are within a predetermined distance from object x, distances from x to the representative video objects may need to be calculated. However, calculating distances to all representative points may involve a high level of computational complexity if performed for every input point x. Therefore, to avoid calculating the distances between the input object and the representative video objects on demand, distances from the arbitrary representative video object $e_1$ and other representative video objects may be pre-calculated in advance. This approach may drastically decrease number of distance calculations for points that will never be added as representative. Therefore, because most of points being clustered are never added as representative, using such an approach may be very efficient.

The method may continue with calculating the distance between the arbitrary video object $e_1$ and the object of interest (e.g., an unclustered video object or unidentified reference video object). In accordance with the triangle inequality, $b_{ei} = |d(x, e_1) - d(e_1, e_i)|$ may be set as a low bound of the distances between x and $e_i$. Because a smaller $b_{ei}$ corresponds to closer reference video objects $e_i$, the method may proceed to calculate distances for $e_i$ corresponding to $b_{ei}$ with minimal value within a predetermined threshold.

In mathematical notation, the neighboring points search algorithm may be described as follows. Let an object x be given. We search for subset C(x) of representative images e from the set E of all representative video images so that the distance between x and the representative video image from the set E are within a predetermined value. C(x):={e ∈ E:d(x,e)≦ϵ}, where E is a full set of clustered representative images, d(.,.) is a distance function that satisfies triangle inequality d(a, b)<d(b, c)+d(c, a) and ϵ is a predefined threshold for two face images to represent the same cluster of a person.

In some example embodiments, after objects in a video are detected and normalized, the objects may be represented by points in a multidimensional space. When two objects are similar, they are assumed to be close in the multidimensional space. Clustering as used within the context of this disclosure is selecting a representative object and grouping objects together so that the distance between each object within the cluster and the representative object is below a predetermined distance in the multidimensional vector space. This approach permits clustering together objects that are similar.

As shown in FIG. 4, the method 400 may commence at operation 402 with initializing a set of neighboring points C(x) as an empty set and with initializing at operation 404 an array of low bound estimates for distances between x and other points with values equal to zeros. At operation 406, the method may select the point closest to X in terms of current values of the low bound estimates. At operation 408, the estimated distance may be compared to the predetermined threshold. If the distance is larger than the predetermined threshold, then the search is finished at operation 418 because the minimal distance estimate is larger than the predetermined threshold and no other point may be in vicinity of x.

If the estimated distance is less than the predetermined threshold, then the exact distance to the selected point is computed at operation 410. At operation 412, the exact distance is compared with the predetermined threshold and if it is below the threshold, then the selected point is added to the set of neighboring points C(x). At operation 416, the distance computed at operation 410 is utilized to compute more precise values of the low bound estimates based on the triangle inequality. Thereafter, the method may return to the operation 406 in order to select the next point with minimal distance estimate.

The method may return to point selection at operation 406 until all the points neighboring x are found and the minimal estimated distance becomes larger than the predetermined threshold. The presented approach may permit quickly selecting only neighboring points while avoiding most complex distance calculations between x and the points outside the neighborhood. In some example embodiments, it may be needed that at least one neighboring point is found. It will be noted that other ways to determine the neighboring points may be utilized according to the general algorithm described herein.

In some example embodiments, the distance function d(x, y) may have some specific properties, which violate constraints under which the neighboring search algorithm works. For example, the triangle inequality may work with some error, or the distance function may be not fully symmetric (i.e. d(x, y)=d(y, x)+e(y, x), where e(x, y) reflects an error in symmetry. In such cases, the neighboring search algorithm may still be applied with some changes.

A neighboring search algorithm for distance function that slightly violates the triangle inequality and symmetry constraints may differ at operation 416 where the low bound estimates are computed. It will be understood that the general logic of the approach may stay the same but the computational formulas may change and involve varying degrees of complexity.

Simplifications may be made in order to decrease computational complexity, which may lead to the omitting of neighboring points (i.e. false rejects). In general, low bound computations for non-standard distance functions shall be done with some additional margin, which may slow down the process but will still preserve the overall improved efficiency.

In the example clustering methods described herein, the effect of false rejects on overall results of the clustering may be negligible due to a large number of input x vectors utilized. Even if the nearest neighbor of a representative objet is improperly rejected, the overall process may not be affected because at least one of the neighbors of the representative object is found. In a worst-case scenario, an extra cluster may be created and the representative objects may cover the space with somewhat higher density then they would otherwise. Thus, false rejects created in case of asymmetrical triangular equations may only slightly increase the overall false reject rate. In the experiments conducted by Applicants, the false rejects rate was at a 1-2% level. Applicants consider this to be an acceptable rate of false rejects considering the increases in performance and scalability achieved. An example workflow of an example method that may be utilized in object clustering and identification is described with reference to FIG. 5.

Figure 5:
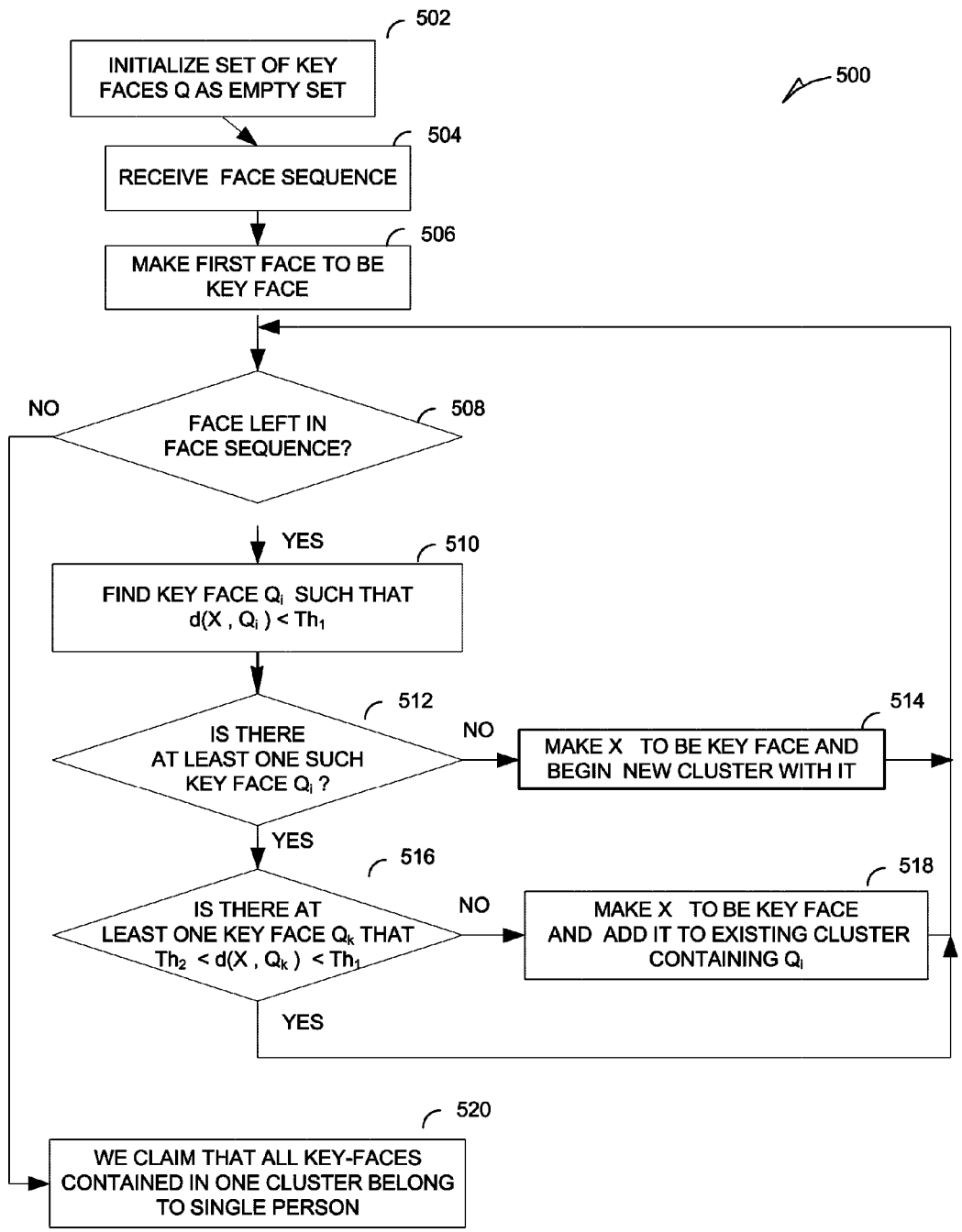
FIG. 5 is a flow chart illustrating a method of comparing objects using a neighboring points search algorithm, in accordance with an example embodiment.

FIG. 5 is a flow chart illustrating a method of key faces selection using a neighboring points search algorithm, in accordance with an example embodiment. The method 500 is described with reference to facial images, which are included in the notion of objects. The method 500 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the clustering and identification processors 200 illustrated in FIG. 2. The method 500 may be performed by the various modules discussed above with reference to FIG. 2. Each of these modules may comprise processing logic.

The method 500 may commence at operation 502 with initializing a set of key faces as an empty set. The method 500 may continue with receiving a face sequence at operation 504. At operation 506, the first face from the face sequence may be made a key face and the first corresponding cluster may be created. If faces are still left in the face sequence, then a next face X is retrieved at operation 508. Otherwise, clustering is finished and all faces within any single cluster are assumed to belong to a single person. This fact may be used in any further processing logic. At operation 510, a search of current face X neighbors is performed using fast neighbors search algorithm. Neighbors are selected so that the distances from the current face X and the neighbors are less than the first predetermined threshold. If no key face is found in the neighborhood of the current face X, the current face X is made a key face and a new cluster may be started using the current face X at operation 514.

When at least one key face $Q_i$ is found, the method may proceed to operation 516. At operation 516, key faces may be further away than the second predetermined threshold but closer than the first threshold. Due to a low number of key faces preserved after operation 510, the key face location may be performed by a straight search. If no such key face is found, it may be presumed that the key face $Q_i$ is too close to X and that $Q_i$ is already a good representation of X. In such case, the presence rate of $Q_i$ is increased by one and the method may return to operation 508. Otherwise, the method may proceed to operation 518 where X becomes another key face in a cluster represented by $Q_i$. From operations 514 and 518, the method may continue to operation 508.

It will be noted that in order to search using fast neighboring search algorithm, it may be beneficial to pre-calculate distances between all representative objects in a cluster. After a new representative image is added, some extra calculation to maintain it in a pre-calculated state may be applied. The pre-calculated distances may be reused or recalculated.

Figure 6:
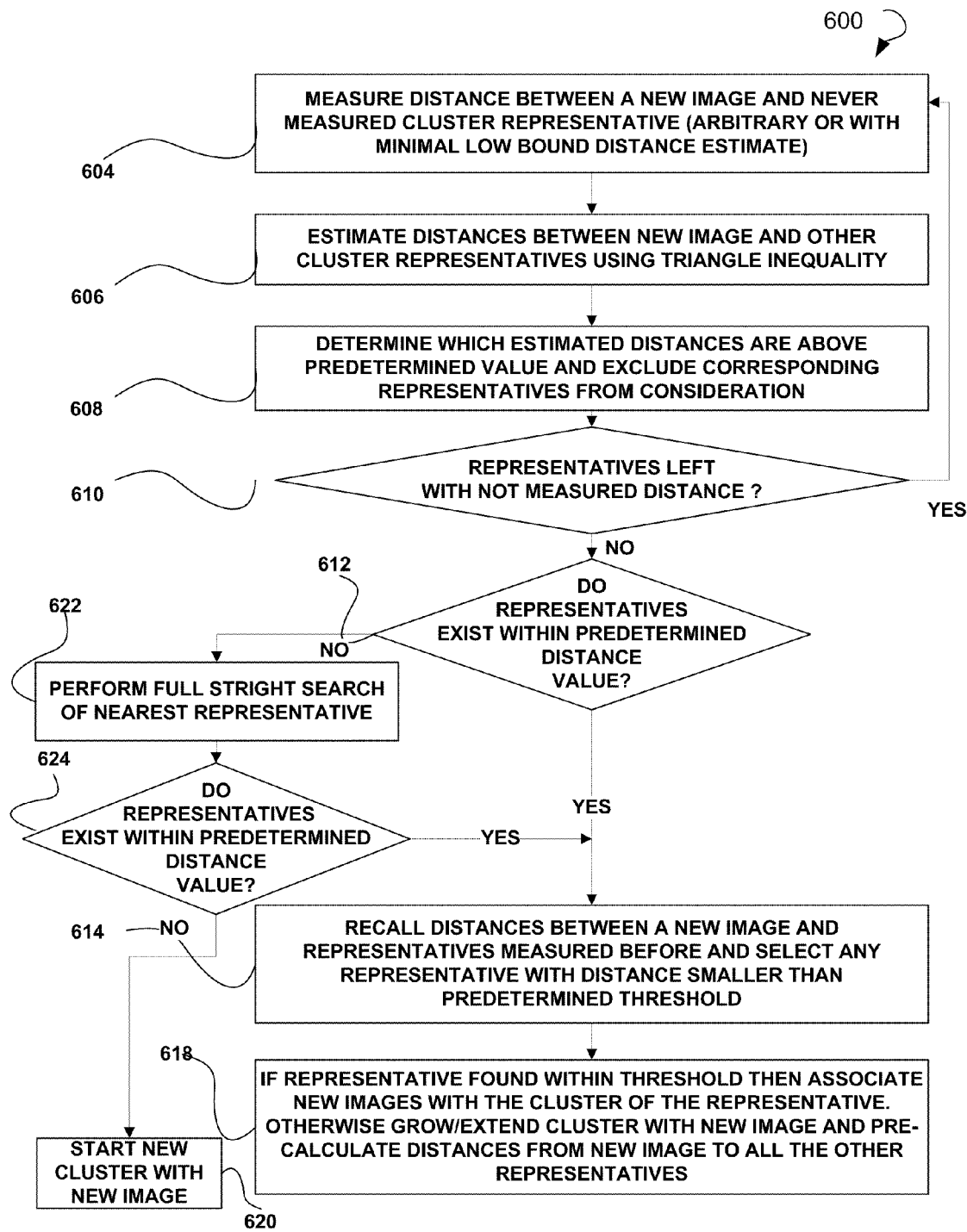
FIG. 6 is a flow chart illustrating a method for object clustering using a neighboring points search algorithm, in accordance with an example embodiment.

FIG. 6 is a flow chart illustrating a method for object clustering using a neighboring points search algorithm, in accordance with an example embodiment. The clustering method 600 may commence by obtaining a frame from a video stream. If no facial images are detected in the frame, the frame may be discarded and the next frame obtained. New frames may be obtained until a frame with at least one facial image is obtained. Once a facial image is detected, and the facial image normalized to produce an object, the object may be grouped with already clustered objects in one of the existing clusters or become the basis of a new cluster.

The clusters may represent video objects that are likely to relate to the same person. It is possible, however, that more than one cluster is created to represent the same person. Whether the face is grouped with any of the existing clusters is determined by comparing unclustered video objects to the objects selected as the representatives of the existing clusters. Thus, the distance between the unclustered video object and the representative video objects of the existing clusters may need to be measured. The video object may then be grouped with the cluster associated with the closest representative video object.

When a facial image is detected in a frame, the method 600 may assume that the facial image is more likely to represent the same person as the facial image detected in the nearby frames rather than a random facial image. This is because adjacent frames are more likely to depict the same object. Accordingly, the new facial image may be compared first to the representative image of the nearby frames of the newly obtained facial image. If the distance between the newly obtained facial image and the representative image of the nearby frames is less than a predetermined threshold, then either the new facial image is added to the cluster or the presence rate of the existing representative image used for the comparison is incremented. Otherwise, fast neighboring search algorithm is applied as described below.

Thus, when the distance between the input facial image and the adjacent facial image is above the predetermined threshold distance, the distance between the input facial image and the current representative facial images is determined. If the distance between the current representative facial image and the new facial image is less than the first predetermined distance but larger than the second predetermined threshold, the facial image is added to the cluster as a separate representative image of the cluster. If the distance is less than the second threshold then the presence rate of the closest representative is increased by one. If no representative images are closer than the first predetermined threshold distance, the method 600 may utilize the facial image to start a new cluster wherein the facial image becomes the representative object with a presence rate of one.

The comparison to the cluster representatives may be performed using neighboring points search algorithm described above. Using the neighboring points search algorithm permits selecting representative faces so that the distance between the representatives faces and the new facial image is less than a predetermined threshold distance. If such representative faces are found, then a face closer than second threshold is found among such faces. If such a representative face exists, the current representative facial image's presence rate is increased and the next facial image is received. If representative faces exist below the first threshold but above the second, the input facial image is added as a new representative image of the cluster. If no representative faces exist below the first threshold, then a full straight search below the first threshold is performed in order to ensure no representative images are missed below the first threshold. If a representative face is found then the same logic as above is applied in clusters and the creation of a cluster representative. If no representative face is found then a new cluster with a new representative image is started.

The full straight search may be needed because distance functions used in facial recognition may not be symmetric and triangle inequality may work with some error. This may lead to some probability of missing close representatives during the fast neighboring points search based on the triangle inequality.

The fast neighboring search algorithm may use pre-calculated distances between the representative images. If a new representative image is added, then a set of these distances may be updated with distances from a new representative to the old ones. These distances may be calculated during a straight search described above and are just reused without additional calculation cost. If a new representative was made without the straight search, then distances to the old representatives may be directly calculated. Generally, before considering a new input image, no special distance pre-calculation may need to done. A set of pre-calculated distances may be kept complete during adding each new representative to the clusters. It will be noted that the number of representative images may be smaller than the overall number of images being clustered. Therefore, the calculation of distances between representatives may be of a low complexity.

At operation 604, the method 600 may determine the distance between the unclustered video object 212 and the arbitrary representative video object 214. To improve performance, a representative object may be selected so that it provides minimal low bound distance estimate. At operation 606, the triangle inequality module 206 of the clustering and identification processors 200 may estimate distances between the unclustered video object 212 and the rest of the representative video objects 216.

At operation 608, representative images having estimated distances as low bounds above the predetermined first threshold are excluded from the search using the triangle inequality using selecting module 210. At operation 610, a number of representatives having estimated distances below the first predetermined threshold and to which direct distance calculation was not yet applied is checked. If such a representative exists, direct distance measurement to the potentially closest point is performed at operation 604. If the distance is below a predetermined threshold, the object is added to the list of neighbors and is excluded from further consideration. If the distance is above a predetermined threshold, the object is excluded from consideration and the method loop may continue until no more representatives are left.

At the method loop exit, a subset of representatives with all distances already measured from the input image to them may be present. At operation 612, the existence of representatives with true distances below the first predetermined threshold may be checked. If such representatives do not exist, then a straight direct search of such representative is performed at operation 622 using distance calculating module 204 in order to avoid false rejection of such representatives due to errors in the triangle inequality. If no representatives below the first threshold are found either way, then a new cluster is created with the new representative at operation 620. Furthermore, the set of pre-calculated distances may be updated for this image by taking into account that all these distances were computed during the straight search part at operation 622.

If at decision block 612 or 624, the associating module 208 determines that representative video objects exist within the first predetermined threshold distance of the unclustered video object 212, then a comparison of the true distance to the second smaller predetermined threshold is performed at operation 614. If a representative is found at operation 614, then the input image is associated with the representative by associating module 208 and the representative presence rate is increased by one. Otherwise, the input image is added as a new representative image to the cluster in which closest representative was found at operations 612 or 624. As the new representative is added, the pre-calculated distances set is updated for the new representative image. An example method for object identification using a neighboring points search algorithm may be described with reference to FIG. 7.

Figure 7:
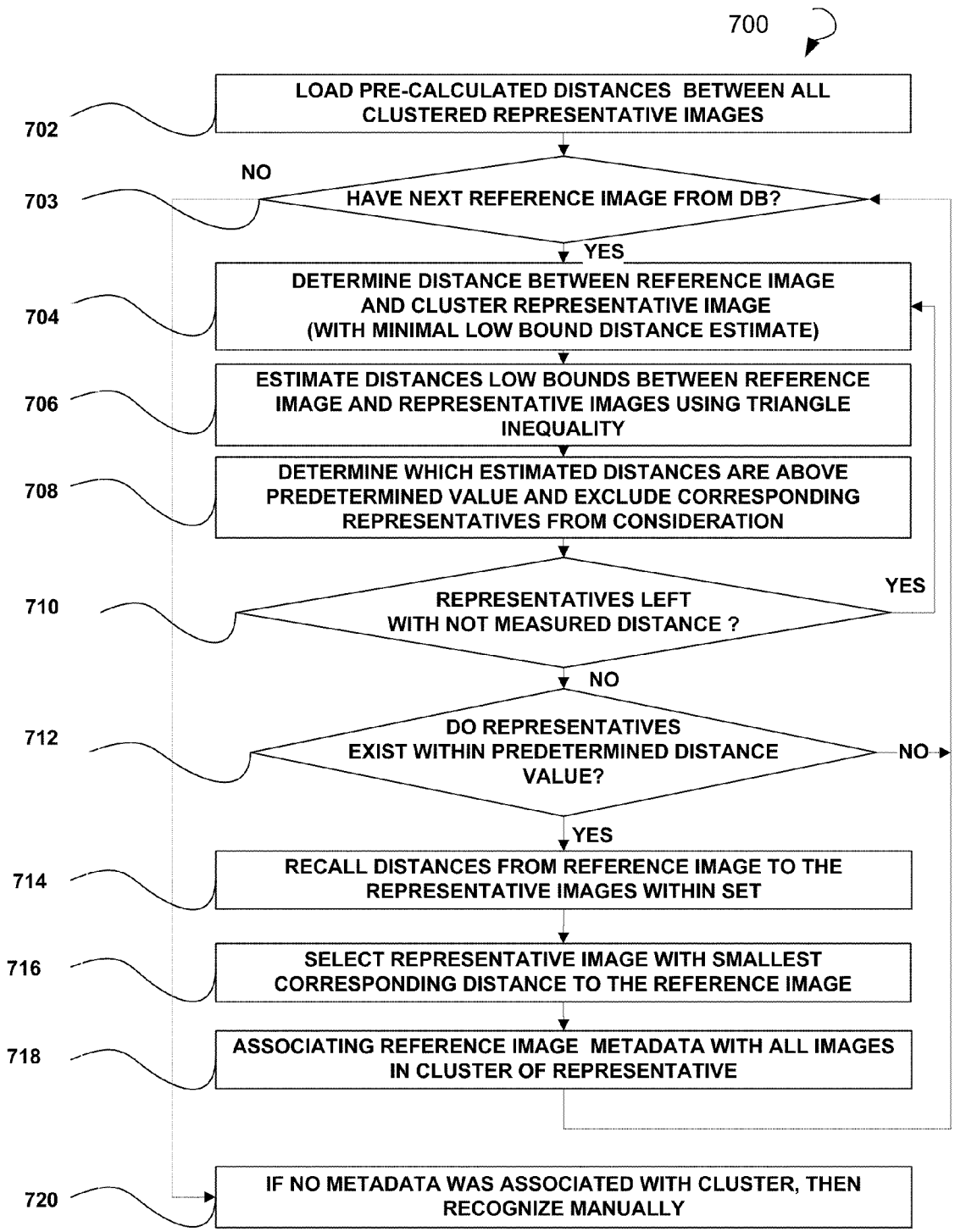
FIG. 7 is a flow chart illustrating a method for object identification using a neighboring points search algorithm, in accordance with an example embodiment.

FIG. 7 is a flow chart illustrating a method for object identification using a neighboring points search algorithm 700, in accordance with an example embodiment. The method may be utilized to identify every representative image of the cluster by comparing it against a database of reference images. Representatives of the same cluster may be identified as different persons. Therefore, making the final decision as to which person whole cluster belongs is a complex task, which may involve inputs from other classifiers from other modalities, like voice and speech recognition, and video subtitles.

In some example embodiments, the method and system for object identification may beneficially utilize a reversed approach for identification of every representative image. Thus, instead of searching the reference database 140 to find reference objects that match every representative object, the method may search representative objects that are within the predetermined threshold distance of the reference objection.

Such a search may be performed more efficiently by utilizing a fast neighboring search algorithm then with a straight search or by using the fast neighboring search algorithm to search among the reference objects. Furthermore, application of fast neighboring search algorithm directly (i.e. finding the best reference image for every representative) may not be practical. Thus, for example, it may be difficult to pre-calculate distances between a million reference objects, while it is easier to pre-calculate the distance between 100-1000 objects (which may be a typical number of representative objects retrieved from a 1-hour video).

The method for object identification may then proceed to assign metadata to objects in clusters based on the comparison of the representative video objects 216 to the reference video objects 220. Since every object may be represented by a point in a multidimensional vector space, mathematically, in reversed formulation, it may be said that for every reference face x in reference database X, we want to find a set of neighboring representative faces $C(x):=\{e \in E: d(x, e) \leq \epsilon\}$. It will be noted that despite the difference in the performed task, the formulation of the identification problem is similar to the formulation of the clustering problem. However, due to different application constraints, the method for searching may be different.

Because the number of reference video objects 220 in a reference database 140 may be larger than a predetermined number for which mutual distance calculation is still possible, direct application of the neighboring points search algorithm may consume considerable resources to the point of being non-practical in a real life situation. The problem, as explained in more detail below, may be reformulated so that a neighboring points search algorithm is efficiently utilized in the face identification.

The method for object identification using a method 700 may permit identification of the representative video objects 216 while performing fewer complex distance computations. A decrease in the distance calculation count may be achieved using a reversed approach to representative identification and the use of the neighboring points search algorithm. Direct approach, within the context of the present disclosure, is understood to mean a search of neighboring images among reference images for each representative object. The reversed approach within the context of the present disclosure means a reverse process (i.e., a search of neighboring images among representative images for every reference image).

Direct and reversed approaches are equivalent and produce the same result. However, in the reversed case, the neighboring points search algorithm may be efficiently applied to decrease the number of complex distance calculations. Applying the neighboring points search algorithm in the direct case may be less efficient because the pre-calculation of distances between reference points is complex due to a large number of reference faces. In contrast, in the case of the reversed approach, the number of distance pre-calculations may be reduced by several orders of magnitude and application of the neighboring points search algorithms may further decrease the complexity of the distance computations.

Thus, instead of searching for all $x \in X$, $\{e \in E: d(x, e) \leq \epsilon\}$ the method 700 may determine $e \in E$, $\{x \in X: d(x, e) \leq \epsilon\}$. These two formulas are equivalent and if the objects in the second formula are determined, the objects in the first formula are determined as well. The problem may be solved by the neighboring points search algorithm as described in more detail above with reference to FIG. 4. Application of the neighboring points search algorithm to face identification permits avoiding most of the distance calculations. Accordingly, there may be no need to keep all the reference faces from the reference database 140 in a computer memory simultaneously. The reference faces may be loaded sequentially, so that for every reference face the neighboring points search algorithm is applied to find neighbors among representatives and then if no neighbors are found, the reference image could be discarded without performance degradation. This approach may provide the ability to work with larger facial reference databases without sacrificing performance and consuming valuable memory resources.

Application of the neighboring points search algorithm for representative identification in the manner described above may require pre-calculation of distances among representative images in clusters. It may be seen that this pre-calculation may be done at the start of face clustering and representative faces selection (if this step is utilized). Thus, at the identification stage, no distance calculation may be needed because the distances are already calculated and may be reused. This may decrease the number of distance calculations even further.

At operation 702, the pre-calculated distances between all clustered representative images may be loaded. Alternatively, distances may be calculated again by the distance calculating module 204 of the clustering and identification processor. At operation 703, the next reference image may be loaded from the reference database 140. If there are no more reference images left, the automatic identification is finished and manual recognition may be performed at operation 720 for all clusters having no representative identified. If the next reference image is successfully loaded, the neighboring points search algorithm may be applied.

At operation 704, the method 700 may determine the distance between the current reference image and the representative image with the least low bound distance estimate. At operation 706, the triangle inequality module 206 of the clustering and identification processors 200 may estimate low bounds of the distances between the current reference image and representative video objects 216. Based on the estimates made at operation 706, at operation 708 the selecting module 210 may deselect a set of representative video objects that are above the predetermined threshold value and exclude them from consideration within the loop 704-710.

When the real distance (as opposed to a distance estimate) is above the predetermined threshold value, the object is excluded from consideration as well. Representative objects with a distance from the reference object, which is less than the threshold, are selected as neighbor objects by selecting module 210 and are added to the corresponding list. At operation 710, if there are objects with a low bound distance estimate below the threshold, then the loop returns to operation 704 in order to iterate the neighboring search algorithm further until the distance to all images having a distance value below the threshold is computed or the image is excluded.

At decision block 712, the associating module 208 may check the number of objects in list of neighboring objects to determine whether any representative video objects are within the predetermined threshold distance of the current reference video. If no representative video objects are within the predetermined threshold distance of the current reference video object, then next reference object is requested at operation 703. If all reference objects are run through the search, and for some clusters have no representatives identified, then the unidentified representative video object 222 may be manually identified at operation 720.

If, on the other hand, it is determined at decision block 712 that there are representative video objects within the predetermined threshold distance of the current reference video object, then the closest reference object is found at operation 714, selected at operation 716, and associated with a representative object of the cluster at operation 718. The method may then return to operation 703 in order to fetch the next reference image from the reference database 140. It may be seen that the described representative images identification approach may render keeping the entire contents of the reference database 140 in memory unnecessary because every reference image may be loaded once and may be discarded if it does not identify any representative image.

If no more reference images are available from the reference database 140 at operation 703, then the automatic identification of the representative object is finished and, optionally, representative images that are not identified may be identified manually at operation 720. Manual recognition at operation 720 may also include manual recognition of already identified clusters in order to check the performance of the automatic identification. The final decision in automatic cluster identification could be performed in several ways. For example, a cluster may be associated with a person having maximum number of representatives associated with the reference object representing the person. If some persons have the same number of associated representatives then the representative with the least distance from the reference object is selected. Another example approach may include selecting a person having the least distance to the cluster. More complex decision rules may involve the output of other classifiers (like voice recognition) and inputs from textual information associated with the video stream. In such cases, a multimodal decision rule could be designed to take into account all information available.

The method 700 is described for the distance function d(x, e) which is symmetric and, therefore, satisfies triangle inequality. However, the method may still be applicable even to asymmetric functions that satisfy triangle inequality to some degree of error. The only peculiarity in the case of asymmetric functions is that the method introduces additional false rejections during the identification process.

Figure 8:
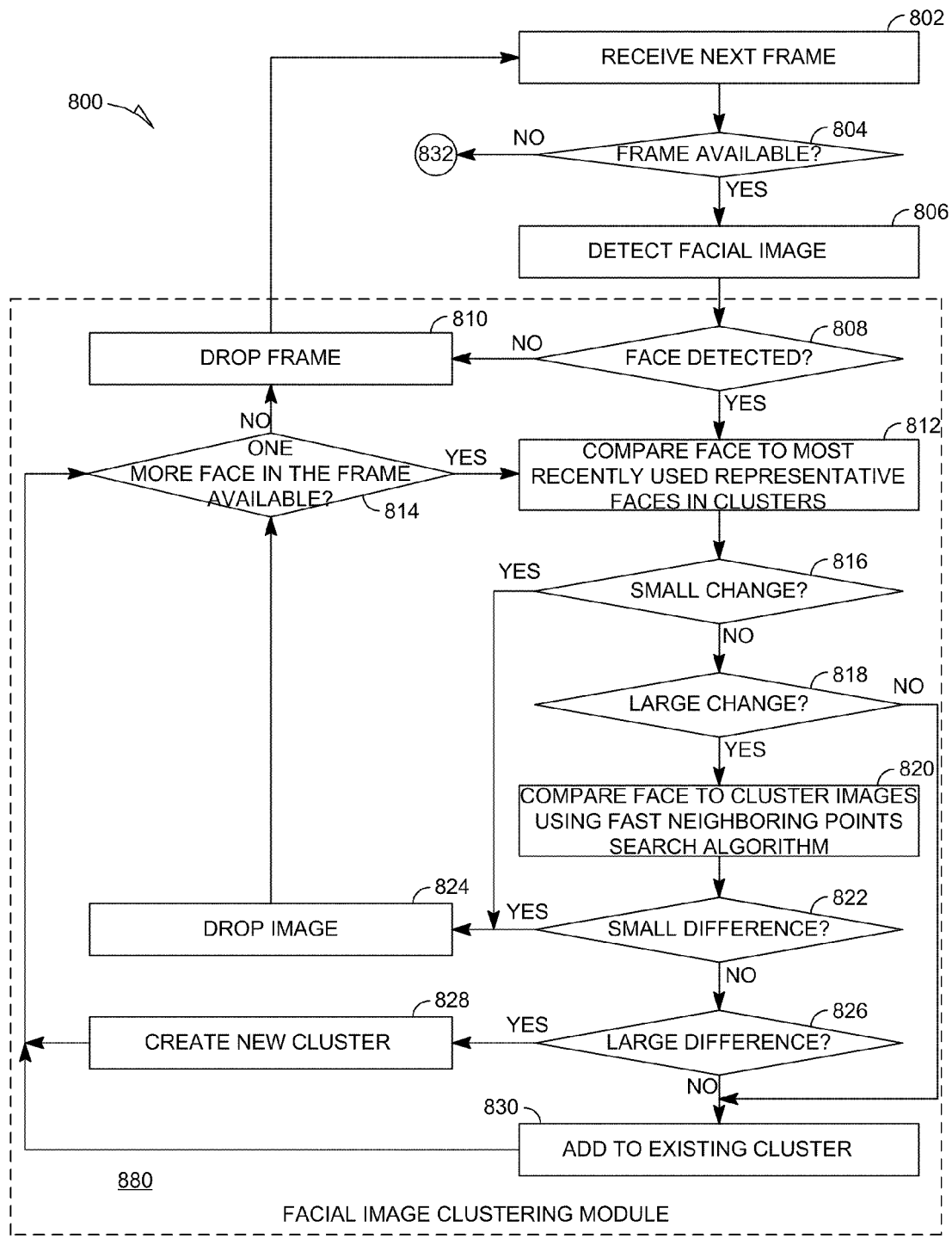
FIGS. 8 and 9 illustrate a flow chart of a method of detecting, clustering, and identifying facial images, in accordance with an example embodiment.
Figure 9:
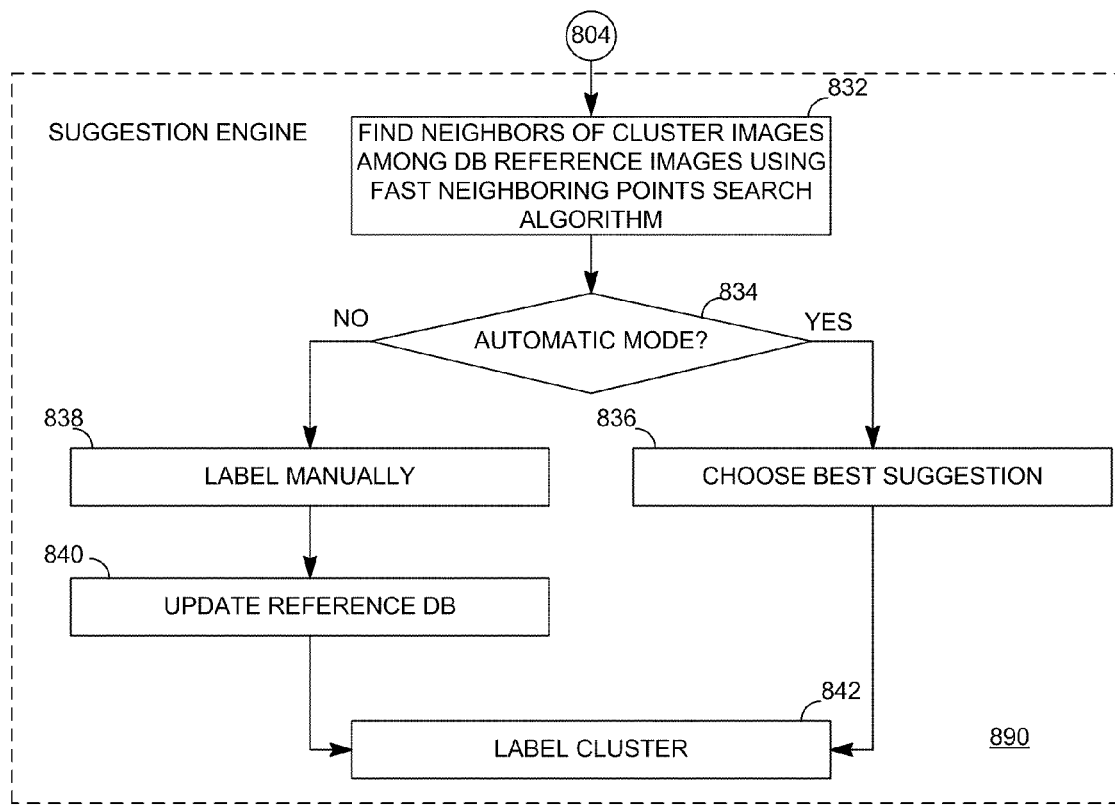

FIGS. 8 and 9 are a flow chart illustrating a method 800 of detecting, clustering, and identifying facial images, in accordance with an example embodiment. The method 800 may be performed by processing logic that may comprise hardware (e.g., dedicated logic, programmable logic, microcode, etc.), software (such as is run on a general-purpose computer system or a dedicated machine), or a combination of both. In one example embodiment, the processing logic resides at the clustering and identification processors 200 illustrated in FIG. 2. The method 800 may be performed by the various modules discussed above with reference to FIG. 2. Each of these modules may comprise processing logic.

Referring to both FIGS. 8 and 9, method 800 may commence at operation 802 with the receiving module 202 receiving a new video frame from a video stream and then detecting faces in that video frame at operation 806. Until all frames of the video stream are received, the clustering process may be performed in the facial image clustering module 880. When all frames of the video stream are received and the clusters are formed, the suggestion process may be started by the suggestion engine 890. Operations of both modules are described in more detail below. At decision block 808, it may be determined whether or not a facial image is detected in the frame. If no facial image is detected, the frame may be dropped at operation 810. If, on the contrary, a facial image is detected, the clustering and identification processor 200 may compare the detected facial image to the facial images in existing clusters at operations 812 and 820.

In some example embodiments, the clusters may initially be stored in a cluster cache that holds all clusters and their representatives. Clusters may have other metadata associated with them besides facial images. Thus, the metadata may be text obtained from audio associated with the facial images in the cluster, or text obtained from the visual content of the video frames from which the facial images were extracted. The metadata may also include other information obtained from the video and accompanying digital media near the point where the facial images in the cluster were extracted.

At operation 812, the distance calculating module 204 may calculate the distance between the facial image and the most recently used representatives in clusters. Such an approach provides faster searching for the closest representative in most cases, since faces in subsequent frames usually belong to same person and are very similar. At decision block 816, it is determined whether the distance is less than a second predetermined threshold. If the distance is less than the second predetermined threshold (e.g., there is a small change), it may indicate that the facial images are substantially similar and that there is no benefit in saving both facial images as representatives. Accordingly, the presence rate of the representative is increased by one and the input facial image may be dropped at operation 824. If the distance is between the first and the second threshold so that image change is neither small nor large, then the input facial image is added to the existing cluster with a presence rate equal to one at operation 830. If the change was large and the image is not similar to any representative image in recent clusters, then all clusters are examined using fast neighboring points search algorithms implemented at operations 820, 822, 826.

At operation 820, the facial image may be compared to the representative facial image using the neighboring points search algorithm described above. If the distance between the facial image and the most recently used representatives in clusters is more than the second predetermined threshold but less than a first, larger predetermined threshold, a decision may be made at decision block 826 that the facial image is associated with the same person as facial images in an existing cluster, and also that there is value in adding the facial image to the existing cluster due to the difference between the facial image and the facial images existing in the cluster. Accordingly, the facial image may be added to an existing cluster at operation 830.

If the distance between the facial image and the most recently used representatives in clusters is above the first, larger predetermined threshold (i.e., there is a large change), the distance may indicate that the facial images are not associated with the same person. Accordingly, a new cluster may be created at operation 828. During the addition of a facial image to an existing cluster, it may be determined that the facial image may need to be added to more than one cluster. This may typically indicate that the facial images in the two clusters identify the same person and such clusters may later be merged into a single cluster. After the facial image is added to a cluster, the next detected facial image in the video frame is fetched at operation 814. If no more facial images are available in the video frame, the next video frame may be received for processing at operation 802.

If no more frames are available, as determined by decision block 804, the suggestion process starts at operation 832 shown in FIG. 9. Thus, at operation 832 a search among reference video objects in the reference database 140 for neighbors of representative cluster images may be performed using a neighboring points search algorithm as described above.

At decision block 834, depending on a mode of the identification, the method 800 flow proceeds to either the manual or the automatic branch. At operation 836, the automatic branch utilizes suggestions based on the neighbors search performed at operation 832. The comparison is made based on the distance from the cluster representative to the reference facial image. The final decision as to in which cluster the person belongs may be performed in several ways. Among them are nearest neighbor, majority voting, and multimodal classification including other modalities like voice recognition, Optical Character Identification (OCR), and subtitles. If, at operation 836, a suggested reference video object is selected, the method 800 may proceed to operation 842 and label the cluster with metadata identifying the cluster as being associated with the reference video object.

If, on the contrary, it is decided at decision block 834 that the facial image may not be reliably identified automatically, the method 800 may proceed to manually label the cluster representative at operation 838. For example, the reference database 140 may be empty and no suggestions are generated, or the confidence level of the available suggestions may be insufficient (as in a case of the reference database 140 being only partially populated with reference data). Thus, an operator may have to identify the clusters manually.

To perform the manual identification, the operator may utilize the user interface 224. The operator may be provided with the reference facial images that are the closest matches to the facial image. For example, the operator may be provided with several reference facial images which are not within the predetermined threshold of the facial image but, nevertheless, are sufficiently close to be likely candidates for the manual comparison. In some example embodiments, the operator may be supplied with information extracted from the video stream, which may be helpful in identification of the facial image. For example, names extracted from textual content of frames using OCR, persons' names from subtitles, names extracted using speech-to-text, an electronic program guide, or a transcript of the video file may be supplied to the operator to increase the likelihood of correct identification. Thus, at operation 838, the operator may visually identify the facial image and update the reference database 140 with a new reference facial image if, at operation 840, the operator decides that no matching reference facial image exists in the reference database 140. Once the reference database 140 is updated with a new reference facial image, the operator may manually label the cluster representative at operation 842.

Optionally, manual cluster labeling may be performed even after automatic label clustering is done. Doing so allows measuring of the quality of the automatic system operation in terms of accuracy, false accept rate, false reject rate or recall, and precision values.

Figure 10:
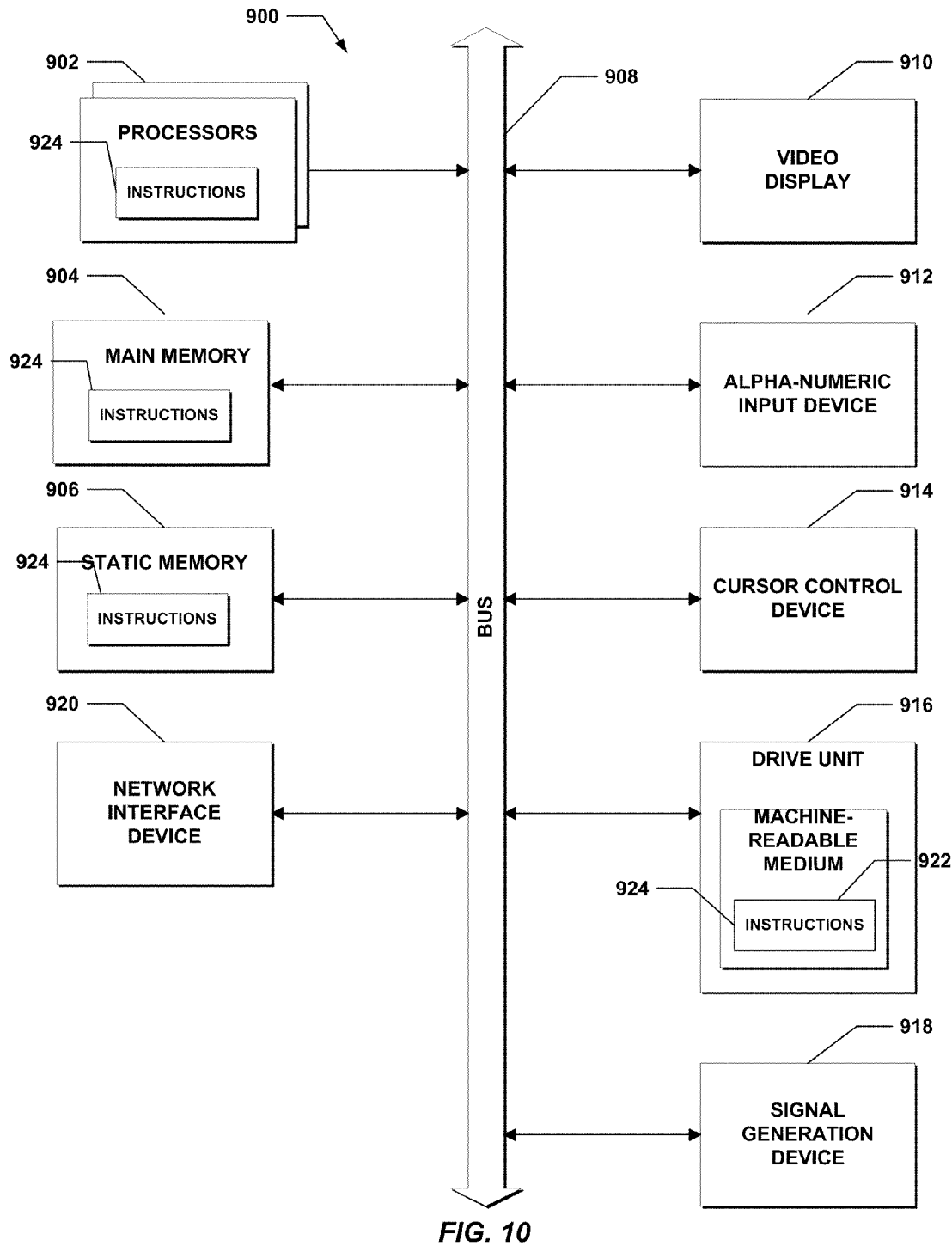
FIG. 10 illustrates a diagrammatic representation of a machine in the example form of a computer system within which a set of instructions for causing the machine to perform any one or more of the methodologies discussed herein may be executed.

FIG. 10 shows a diagrammatic representation of a machine in the example form of a computer system 900, within which a set of instructions for causing the machine to perform any one or more of the methodologies discussed herein may be executed. In various example embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a PC, a tablet PC, a set-top box (STB), a PDA, a cellular telephone, a portable music player (e.g., a portable hard drive audio device such as an MP3 player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes one or more processors 902 (e.g., a central processing unit (CPU), a graphics processing unit (GPU) or both), a main memory 904, and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a cursor control device 914 (e.g., a mouse), a drive unit 916, a signal generation device 918 (e.g., a speaker), and a network interface device 920.

The drive unit 916 includes a machine-readable medium 922 on which is stored one or more sets of instructions and data structures (e.g., instructions 924) embodying or utilized by any one or more of the methodologies or functions described herein. The instructions 924 may also reside, completely or at least partially, within the main memory 904 and/or within the processors 902 during execution thereof by the computer system 900. The main memory 904 and the processors 902 also constitute machine-readable media.

The instructions 924 may further be transmitted or received over a network 926 via the network interface device 920 utilizing any one of a number of well-known transfer protocols (e.g., Hyper Text Transfer Protocol (HTTP), TCP/IP, etc.).

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" may also include computer-readable medium. The term "machine-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAMs), read only memory (ROMs), and the like.

The example embodiments described herein may be implemented in an operating environment comprising software installed on a computer, in hardware, or in a combination of software and hardware.

Thus, a system and method for object clustering and identification have been described. Although embodiments have been described with reference to specific example embodiments, it will be evident that various modifications and changes may be made to these example embodiments without departing from the broader spirit and scope of the present application. Accordingly, the specification and drawings are to be regarded in an illustrative rather than a restrictive sense.

What is claimed is:

1. A computer-implemented method comprising:
   receiving an unclustered video object;
   determining a first distance between the unclustered video object and an arbitrary representative video object, the arbitrary representative video object being selected from video objects representative of clusters comprising one or more clustered video objects;
   determining estimate distances between the unclustered video object and the representative video objects based on the first distance and precalculated distances between the arbitrary representative video object and the representative video objects; and
   based on the estimated distances, associating the unclustered video object with a cluster as a clustered video object.

2. The computer-implemented method of claim 1, wherein the estimated distances are determined based on a triangle inequality.

3. The computer-implemented method of claim 1, further comprising:
   selecting one or more distances from the estimated distances within a predetermined threshold;
   selecting one or more objects from the representative video objects associated with the estimated distances;
   calculating distances between the unclustered video object and the representative video objects; and
   associating the unclustered video object with a cluster based on the distances.

4. The computer-implemented method of claim 3, wherein the unclustered video object is associated with the cluster corresponding to a representative video object closest to the unclustered video object.

5. The computer-implemented method of claim 3, further comprising:
   determining that no estimated distances are within the predetermined threshold;
   creating a new cluster, based on the determination; and
   associating the unclustered video object with the new cluster.

6. A computer-implemented method comprising:
   receiving an unidentified representative video object of a cluster for identification;
   determining a first distance between the unidentified representative video object of the cluster and an arbitrary reference video object, the arbitrary reference video object being selected from reference video objects having associated identities;
   determining estimate distances between the unidentified representative video object and the reference video objects based on the first distance and precalculated distances between the arbitrary reference video object and the reference video objects;
   determining an identity of the unidentified representative video object based on the estimated distances, the identity of the unidentified representative video object being the identity of a reference video object; and
   associating the identity of the reference video object with the unidentified representative video object and video objects associated with the cluster represented by the unidentified representative video object.

7. The computer-implemented method of claim 6, further comprising:
   selecting the estimated distances within a predetermined threshold;
   selecting further reference video objects associated with the estimated distances within the predetermined threshold;
   calculating distances between the unidentified representative video object and the further reference video objects; and
   associating the identity of a further reference video object with the unidentified representative video object and video objects associated with the cluster represented by the unidentified representative video object based on the distances.

8. The computer-implemented method of claim 6, wherein associating the identity of the reference video object with the unidentified representative video object and objects associated with the cluster represented by the unidentified representative video object further comprises associating metadata describing the identity of the reference video object with the cluster, the reference video object determined as being the closest reference video object to the unidentified representative video object.

9. A system comprising:
   one or more processors and a non-transitory computer-readable storage medium storing executable computer program instructions that when executed cause the one or more processors to:
      receive an unclustered video object;
      determine a first distance between the unclustered video object and an arbitrary representative video object, the arbitrary representative video object being selected from video objects representative of clusters comprising one or more clustered video objects;

determine estimate distances between the unclustered video object and the representative video objects based on the first distance and precalculated distances between the arbitrary representative video object and the representative video objects; and associate the unclustered video object with a video cluster as a clustered video object based on the estimated distances.

10. The system of claim 9, further comprising instructions that when executed cause the processors to:

select one or more distances from the estimated distances within a predetermined threshold;

select one or more video objects from the representative video objects associated with the estimated distances;

calculate distances between the unclustered video object and the representative video objects; and associate the unclustered video object with a cluster based on the distances.

11. The system of claim 9, wherein the unclustered video object is associated with the cluster corresponding to a representative video object closest to the unclustered video object.

12. The system of claim 10, further comprising instructions that when executed cause the processors to:

determine that no estimated distances are within the predetermined threshold;

create a new cluster, based on the determination; and associate the object with the new cluster.

13. A system comprising:

one or more processors and a non-transitory computer-readable storage medium storing executable computer program instructions that when executed cause the one or more processors to:

receive an unidentified representative video object of a cluster for identification;

determine a first distance between the unidentified representative video object of the cluster and an arbitrary reference video object, the arbitrary reference video object being selected from reference video objects having associated identities;

determining estimate distances between the unidentified representative video object and the reference video objects based on the first distance and precalculated distances between the arbitrary reference video object and the reference video objects;

determine an identity of the unidentified representative video object based on the estimated distances, the identity of the unidentified representative video object being the identity of a reference video object; and associate the identity of the reference video object with the unidentified representative video object and video objects associated with the cluster represented by the unidentified representative video object.

14. The system of claim 13, further comprising instructions that when executed cause the processors to:

select the estimated distances within a predetermined threshold and to select the further reference video objects associated with the estimated distances;

calculate distances between the unidentified representative video object and the further reference video objects; and associate the identity of a further reference video object with the unidentified representative video object and video objects associated with the cluster represented by the unidentified representative video object based on the distances.

15. The system of claim 13, wherein associating the identity of the reference video object with the unidentified representative video object and objects associated with the cluster represented by the unidentified representative video object further comprises associating metadata describing the identity of the reference video object with the cluster, the reference video object determined as being the closest reference video object to the unidentified representative video object.

16. The system of claim 13, further comprising instructions that when executed cause the processors to receive a manual identification of the unidentified representative video object.

17. A non-transitory computer-readable storage medium storing executable computer program instructions performing steps comprising:

receiving an unclustered video object;

determining a first distance between the unclustered video object and an arbitrary representative video object, the arbitrary representative video object being selected from video objects representative of clusters comprising one or more clustered video objects;

determining estimate distances between the unclustered video object and the representative video objects based on the first distance and precalculated distances between the arbitrary representative video object and the representative video objects; and based on the estimated distances, associating the unclustered video object with a cluster as a clustered video object.

18. An apparatus comprising:

means for receiving an unclustered video object;

means for determining a first distance between the unclustered video object and an arbitrary representative video object, the arbitrary representative video object being selected from video objects representative of clusters comprising one or more clustered video objects;

means for determining estimate distances between the unclustered video object and the representative video objects based on the first distance and precalculated distances between the arbitrary representative video object and the representative video objects; and means for associating the unclustered video object with a cluster as a clustered video object based on the estimated distances.

19. A non-transitory computer-readable storage medium storing executable computer program instructions performing steps comprising:

receiving an unidentified representative video object of a cluster for identification;

determining a first distance between the unidentified representative video object of the cluster and an arbitrary reference video object, the arbitrary reference video object being selected from reference video objects having associated identities;

determining estimate distances between the unidentified representative video object and the reference video objects based on the first distance and precalculated distances between the arbitrary reference video object and the reference video objects;

determining an identity of the unidentified representative video object based on the estimated distances, the identity of the unidentified representative video object being the identity of a reference video object; and associating the identity of the reference video object with the unidentified representative video object and video objects associated with the cluster represented by the unidentified representative video object.

20. An apparatus comprising:
means for receiving an unidentified representative video object of a cluster for identification;
means for determining a first distance between the unidentified representative video object of the cluster and an arbitrary reference video object, the arbitrary reference video object being selected from reference video objects having associated identities;
means for determining estimate distances between the unidentified representative video object and the reference video objects based on the first distance and precalculated distances between the arbitrary reference video object and the reference video objects;
means for determining an identity of the unidentified representative video object based on the estimated distances, the identity of the unidentified video object being the identity of a reference video object; and
means for associating the identity of the reference video object with the unidentified representative video object and video objects associated with the cluster represented by the unidentified representative video object.

21. The computer-implemented method of claim 3, wherein associating the unclustered video object with the cluster based on the distances further comprises:
determining whether the distance between the unclustered video object and the representative video object closest to the unclustered video object is above a second threshold and below the first threshold; and
responsive to the unclustered video object being above the second threshold and below the first threshold, associating the unclustered video object with the cluster as a new representative object of the cluster.

22. The computer-implemented method of claim 3, wherein associating the unclustered video object with the cluster based on the distances further comprises:
determining whether the distance between the unclustered video object and the representative video object closest to the unclustered video object is below a second threshold, the second threshold below the first threshold; and
responsive to the unclustered video object being below the second threshold, increasing a presence rate of the representative video object.

23. The computer-implemented method of claim 22, further comprising:
analyzing presence rates for a plurality of representative objects in the cluster; and
filtering the plurality of representative objects based on their respective presence rates to determine a set of representative objects having the highest presence rates to represent the cluster.

* * * * *